United States Patent

[11] 3,562,637

| [72] | Inventor | Emanuel Gikow<br>West Long Branch, N.J. |
|---|---|---|
| [21] | Appl. No. | 839,538 |
| [22] | Filed | July 7, 1969 |
| [45] | Patented | Feb. 9, 1971 |
| [73] | Assignee | the United States of America, as<br>represented by the Secretary of the Army. |

[54] LOW VOLTAGE DC CONTROL OF VOLTAGE-VARIABLE CAPACITORS
3 Claims, 3 Drawing Figs.

[52] U.S. Cl. .................................................. 323/74,
317/255, 323/93
[51] Int. Cl. ...................................................... H02m 5/08,
H02p 13/00
[50] Field of Search ........................................ 323/74, 93;
317/255; 333/19, 70R; 331/36C

[56] References Cited
UNITED STATES PATENTS

| 2,802,171 | 8/1957 | Minder .......................... | 323/93X |
| 3,470,446 | 9/1969 | Berry et al. .................... | 323/93X |

*Primary Examiner*—J. D. Miller
*Assistant Examiner*—G. Goldberg
*Attorneys*—Harry M. Saragovitz, Edward J. Kelly, Herbert Berl and Charles F. Gunderson

ABSTRACT: This disclosure covers voltage-variable capacitors, and circuits for applying a control voltage to voltage-variable capacitors. More particularly, this disclosure is of circuits for connecting a plurality of voltage-variable capacitors to be actuated by a common control voltage.

PATENTED FEB 9 1971

3,562,637

INVENTOR,
EMANUEL GIKOW

BY: Charles L. Gunderson AGENT
Harry M. Saragovitz,
Edward J. Kelly &
Herbert Berl ATTORNEYS.

LOW VOLTAGE DC CONTROL OF VOLTAGE-VARIABLE CAPACITORS

The invention described herein may be manufactured, used, and licensed by or for the Government for governmental purposes without payment to me of any royalty thereon.

BACKGROUND OF THE INVENTION

Voltage-variable capacitor are well known and include, for example, certain dielectric types of capacitors, and the "Varicap" types. The capacity of the dielectric types can be controlled by varying the potential gradient across the dielectric which changes the dielectric constant. The capacity of the Varicap types, which are based on a semiconductor material that exhibits a capacity across a junction, can be controlled by varying the potential of a control voltage of a given polarity across the junction.

Certain types of voltage-variable capacitors are advantageous for certain purposes, but all have limitations as to the available capacity, or limitations as to the tolerable, alternating signal voltage that can be accommodated by the capacitor, or the amount of control voltage that may be needed to provide the necessary degree of capacitance variation. They are also limited in some cases, where the applied signal voltage has an appreciable effect on the control voltage and shifts the effective capacity in an undesired manner.

It is therefore an object of this invention to provide a circuit that will extend the useable limits of voltage-variable capacitors.

It is a further object of this invention to provide a circuit that will give a wider range of control of capacity for a given control voltage.

SUMMARY OF THE INVENTION

A plurality of voltage-variable capacitors are connected in series circuit requiring a variable, capacitive reactance. One polarity of a control voltage is connected to the odd junctions of the series connection of voltage-variable capacitors, and the other polarity of the control voltage is connected to the even junctions of the series connection of voltage-variable capacitors. This provides a very much greater control of the overall capacity with a comparatively low DC value of control-voltage and comparatively less change in control-voltage for a given change in capacity.

BRIEF DESCRIPTION OF THE DRAWING

The three FIGS. in the drawing show circuit diagrams of typical connections of a source of control voltage to a series connection of voltage-variable capacitors for use in an alternating-current circuit.

DETAILED DESCRIPTION OF THE PREFERRED EMBODIMENT

Figure 1:
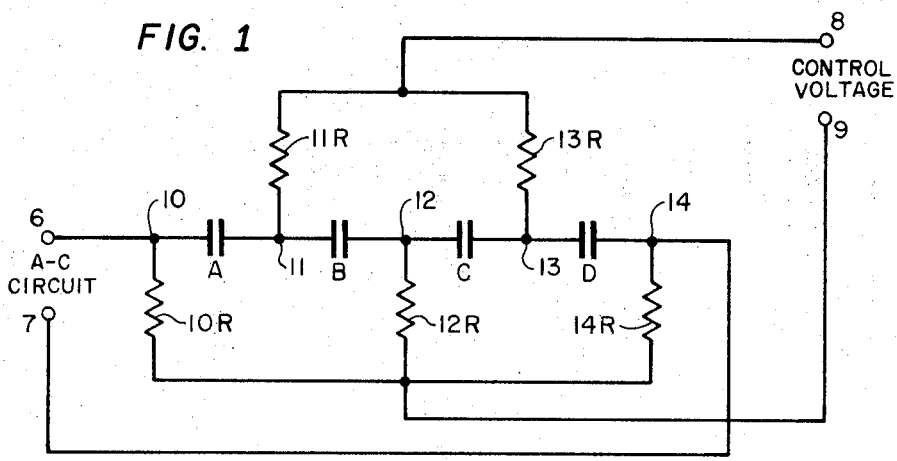

FIG. 1 shows a circuit diagram with voltage-variable capacitors A through D connecting series across the terminals 6 and 7 of an AC circuit or utilization circuit. The junctions of the voltage-variable capacitors are numbered, consecutively, 10 through 14. A source of control voltage is applied across the terminals 8 and 9, with one potential of the sources of control voltage connected to the even junctions of the series connection of voltage-variable capacitors through resistors that are numbered 10R, 12R, and 14R to correspond with the junctions. The other potential of the source of control voltage is connected to the odd junctions of the series connection of voltage-variable capacitors through resistors that are, again, correspondingly numbered 11R and 13R.

In operation, as the single control voltage is varied, it varies the capacitance of all of the voltage-variable capacitors in the series. This produces a corresponding effect on the overall capacity across the terminals 6 and 7 of the utilization circuit.

Figure 2:
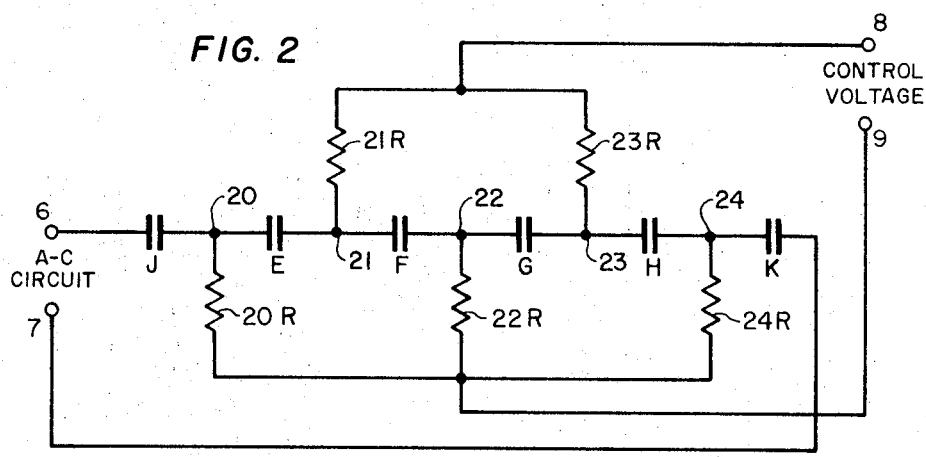

FIG. 2 shows another series of voltage-variable capacitors E, F, G, and H, and with their series junctions consecutively numbered 20 through 24. The voltage-variable capacitors are connected—through decoupling capacitors J and K—across the terminals 6 and 7 of an alternating-current circuit or utilization circuit. A source of control voltage is applied across the terminals 8 and 9 as before. One potential of the source of control voltage is, again, connected to the even junctions of the series connection of voltage-variable capacitors through resistors that are numbered 20R, 22R, and 24R and the other potential of the source of control voltage is connected to the odd junctions through resistors 21R, 23R to correspond to the numbering of the terminals.

In FIG. 2 it is noted that the alternating current circuit is not in direct contact with voltage-variable capacitors or their control voltage potentials, but is isolated by the decoupling capacitors J and K. These may be conventional capacitors rather than voltage-variable capacitors, since only one potential of the source of control voltage is applied to them. Capacitors J and K would, normally, have no effect on the AC circuit, but they may be of values that will have an effective reactance at the frequencies involved if desired.

Figure 3:
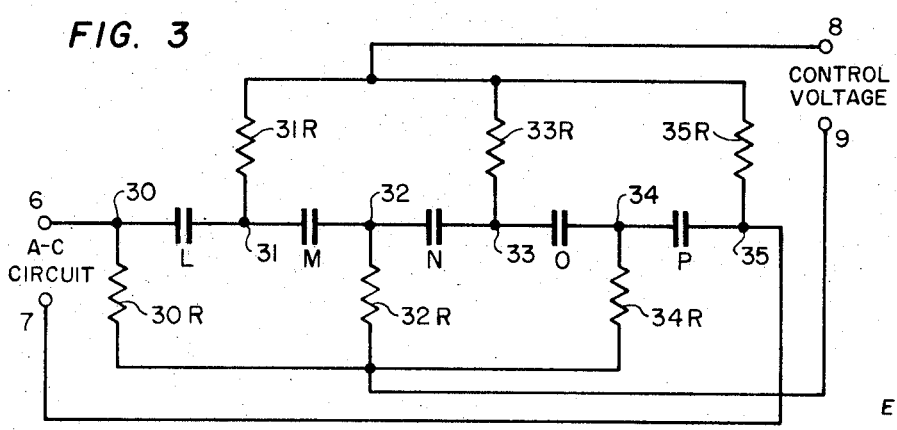

FIG. 3 shows a connection of voltage-variable capacitors L through P, again in series, across the terminals 6 and 7 of a utilization circuit. The junctions of the voltage-variable capacitors are numbered, sequentially, 30 through 35 and, again, the source of control voltage at terminals 8 and 9 has one polarity connected to the even numbered junctions through even numbered resistors, and the other polarity of the source of control voltage is connected to the odd numbered junctions through odd numbered resistors.

In the case of FIG. 3, the opposing polarities, rather than the same polarity, of the source of control voltage are connected to the opposing terminals of the utilization circuit, which may be desirable for certain purposes.

The operation of these species of FIGS. 2 and 3 is the same as that of FIG. 1 with the exception of the differences in any effect of the control voltage on the utilization circuit or vice versa.

The resistors, in all of these species, must all be of a high enough value, with respect to the capacitive reactance across the terminals 6 and 7, to have negligible effect on the rest of the circuit. The same isolation from the rest of the circuit may also be provided by inductors of sufficient inductive reactance for the frequencies involved.

The potential and the change of potential of the control voltage must be within the limits prescribed for the type of voltage-variable capacitors being used.

The polarity of the control voltage is not indicated since it depends on the voltage-variable capacitors being used. If they are of the dielectric types, for example, that are not polarity sensitive, it does not matter which polarity is applied to either of the terminals. If the capacitors are of the Varicap type, for example, that are polarity sensitive, the orientation of the capacitors must be in accordance with the polarity of the control voltage connection.

Other voltage-variable capacitors can be added in parallel with some or all of the capacitors of the series in a well known manner to add more overall capacity when needed.

In a typical, variable, capacitive circuit in accordance with FIG. 1, the voltage-variable capacitors A through D may have a dielectric of lead strontium titanate, with one-eighth inch diameter electrodes spaced 3.5 mils apart. A change of control voltage at terminals 8 and 9 from 0 to 350 volts will cause a change in capacity of from 150 to 25 picrofarads across terminals 6 and 7. The resistors should all be in the order of 20,000 ohms at 1 megacycle.

I claim:

1. A circuit for controlling voltage-variable capacitors comprising a plurality of voltage-variable capacitors connected in series; said plurality of voltage-variable capacitors having alternate, odd and even junctions between said capacitors in said series; a source of control voltage; means for connecting one polarity of said source of control voltage to said odd junctions of said voltage-variable capacitors; means for connecting the other polarity of said source of control voltage to said even junctions of said voltage-variable capacitors; and means for connecting said series of voltage-variable capacitors into an AC electric circuit.

2. In a circuit as in claim 1 said means for connecting said source of control voltage to said odd and said even junctions of said voltage-variable capacitors comprising a plurality of resistors, each having a value substantially higher than the capacitive impedance of said voltage-variable capacitors, and each of said resistors connecting one of said junctions to the appropriate polarity of said source of control voltage.

3. In a circuit as in claim 1, said AC, electrical circuit having a pair of terminals; and said means for connecting said series of voltage-variable capacitors into said AC, electrical circuit comprising a first capacitor cone connecting one end of said series of voltage-variable capacitors to one terminal of said AC, electrical circuit, and a second capacitor connecting the other end of said series of voltage-variable capacitors to the other terminals of said AC electrical circuit.